No. 826,944. PATENTED JULY 24, 1906.
L. KRIEGER.
MEANS FOR MOUNTING GEAR WHEELS.
APPLICATION FILED JAN. 10, 1906.

UNITED STATES PATENT OFFICE.

LOUIS KRIEGER, OF PARIS, FRANCE.

MEANS FOR MOUNTING GEAR-WHEELS.

No. 826,944.  Specification of Letters Patent.  Patented July 24, 1906.

Application filed January 10, 1906. Serial No. 295,396.

*To all whom it may concern:*

Be it known that I, LOUIS KRIEGER, engineer, of 45 Boulevard Haussmann, Paris, France, have invented a new and useful Improvement in Means for Mounting Gear-Wheels on the Ends of Shafts, which improvement is fully set forth in the following specification.

This invention has for its object when driving by means of a train of gearing to allow gear-wheels of very small diameter to be mounted upon shafts of a diameter sufficiently large to resist strains.

When a gear-wheel is fitted upon its shaft in the ordinary manner it is necessary to provide a hole of a diameter such that the crown beneath the base of the teeth is too weak to support the strains, and the gear-wheel usually breaks at the cotter-pin by reason of its being the point of least strength.

This invention consists in an arrangement of fitting a gear-wheel on a shaft by which this trouble is avoided. For this purpose the gear-wheel is provided with a conical projection of small taper, which fits into a conical recess of the same angle formed in the extremity of the shaft. The two cones which are maintained in contact are keyed together by a bolt of small diameter which passes through the gear-wheel and screws into a threaded hole tapped in the bottom of the recess situated at the end of the shaft. The head of the bolt is provided with a suitable arrangement which prevents it from unscrewing. Under these conditions the two parts (shaft and gear-wheel) work perfectly, there being no weak spot in either of them, as the groove in the shaft for the cotter-pin may be made in a proper thickness of metal.

In the case in which the machine does not allow of the shaft being of a thickness sufficient to form a recess the portion in which the recess is formed may be thickened. This invention is particularly applicable to electric motors, and especially to motors adapted for the traction of vehicles.

The annexed drawings illustrate one method of carrying out this invention.

Figure 2:
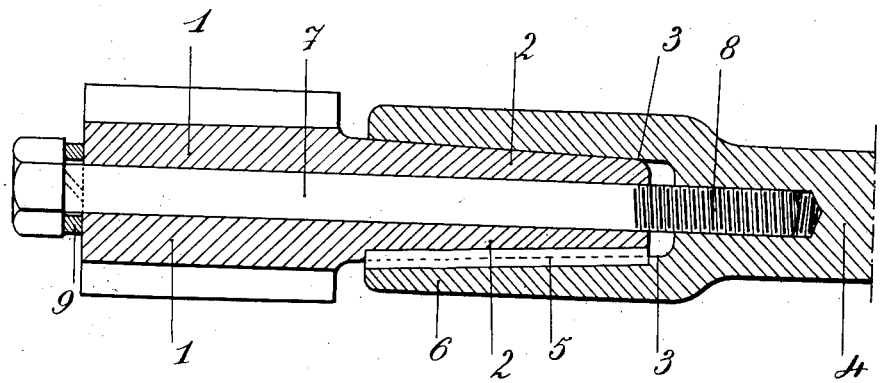
Figure 1:
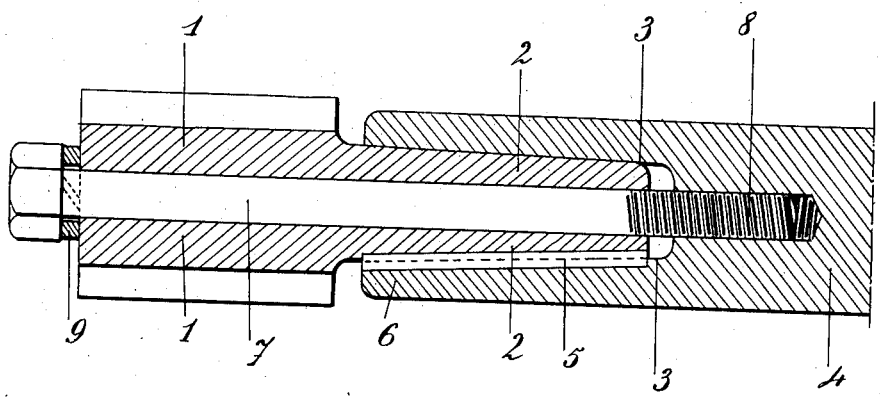

In the drawings, Figure 1 is a longitudinal section of a gear-wheel fitted without thickening the shaft. Fig. 2 is a similar section, the shaft being thickened.

In the figures the gear-wheel 1 is in one piece with the conical recess 2, having a small taper which fits into a cone 3 of the same angle formed in the shaft 4. The keying is effected by the cotter-pin 5.

Fig. 2 shows the recess arranged in an extra thickness of metal 6, provided at the end of the shaft 4 in the case in which the shaft in the inside of the machine is of a thickness insufficient to contain the cone.

The gear-wheel is maintained in position by means of a bolt 7 of small diameter which passes through the gear-wheel and being screw-threaded at 8 can screw into a threaded hole tapped at the end of the shaft in the bottom of the conical recess 3. The arrangement shown in the drawings for preventing the bolt 7 from becoming unscrewed consists in a split elastic washer 9.

I claim—

1. The combination with a gear-wheel having a projection extending therefrom, of a shfat provided with a recess adapted to receive the projection, and means for securing the projection within the recess against rotary movement relative to the shaft.

2. The combination with a gear-wheel having a projection extending axially therefrom, of a shaft provided in its end with a recess adapted to receive the projection, and means for securing the projection within the recess against rotary movement relative to the shaft.

3. The combination with a gear-wheel having a projection extending axially therefrom, of a shaft provided in its end with a recess adapted to receive the projection, means for preventing relative rotation of the shaft and gear-wheel, and means for preventing their longitudinal displacement.

4. The combination with a gear-wheel having a conical projection extending axially therefrom, of a shaft provided in its end with a conical recess adapted to receive the projection, and means for preventing rotative and longitudinal displacement of the gear-wheel and shaft.

5. The combination with a gear-wheel having a conical projection extending axially therefrom, of a shaft provided in its end with a conical recess adapted to receive the projection, a cotter-pin to prevent relative rotation of the gear-wheel and shaft, and a bolt extending axially of the gear-wheel and threaded into the shaft to prevent their longitudinal displacement.

6. The combination with a gear-wheel having a conical projection extending axially therefrom, of a shaft enlarged at its end and having provided therein a conical recess adapted to receive the projection, a bolt extending axially through the gear-wheel and threaded into the shaft at the bottom of the recess to exert tension to draw the gear-wheel projection into the recess.

In testimony whereof I have signed this specification in the presence of two subscribing witnesses.

LOUIS KRIEGER.

Witnesses:
HANSON C. COXE,
GASTON DE MESTRAL.